United States Patent
Kang et al.

(10) Patent No.: US 8,466,811 B2
(45) Date of Patent: Jun. 18, 2013

(54) THIMBLE-TYPE INTERMEDIATION DEVICE AND METHOD FOR RECOGNIZING FINGER GESTURE USING THE SAME

(75) Inventors: Sang Seung Kang, Daejeon (KR); Jae Hong Kim, Daejeon (KR); Chan Kyu Park, Daejeon (KR); Cheon Shu Park, Daejeon (KR); Dae Ha Lee, Daejeon (KR); Min Su Jang, Daejeon (KR); Hyeon Sung Cho, Daejeon (KR); Joo Chan Sohn, Daejeon (KR); Jae Yeon Lee, Daejeon (KR); Yun Koo Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 343 days.

(21) Appl. No.: 12/845,199

(22) Filed: Jul. 28, 2010

(65) Prior Publication Data

US 2011/0148669 A1 Jun. 23, 2011

(30) Foreign Application Priority Data

Dec. 17, 2009 (KR) .................. 10-2009-0126262

(51) Int. Cl.
*H03K 17/94* (2006.01)
(52) U.S. Cl.
USPC ............................................. 341/20
(58) Field of Classification Search
USPC ................... 341/20, 156–158, 163, 173–177
See application file for complete search history.

(56) References Cited

U.S. PATENT DOCUMENTS

| 7,498,956 B2 | 3/2009 | Baier et al. |
| 2004/0032346 A1 | 2/2004 | Kim et al. |
| 2009/0096746 A1 | 4/2009 | Kruse et al. |
| 2009/0212979 A1 | 8/2009 | Catchings et al. |
| 2011/0118748 A1* | 5/2011 | Itkowitz ................. 606/130 |

FOREIGN PATENT DOCUMENTS

| KR | 1020040037891 A | 5/2004 |
| KR | 10-2005-007329 A | 5/2005 |
| KR | 10-0634494 B1 | 10/2006 |
| KR | 1020080103327 A | 11/2008 |

OTHER PUBLICATIONS

R.C. King et al., "An HMM Framework for Optimal Sensor Selection with Application to BSN Sensor Glove Design", Jun. 2007, pp. 58-62, EmNets, Cork, Ireland.

* cited by examiner

*Primary Examiner* — Hieu Nguyen

(57) ABSTRACT

Provided are a thimble-type intermediation device and a method for recognizing a finger gesture using the same. The thimble-type intermediation device includes: a motion sensing unit sensing a motion of a user's finger and generating the sensed result as motion data; a tactile sensing block sensing a tactile behavior of the user's finger and generating the sensed result as tactile data; a control unit recognizing the gesture and tactile behavior of the user's finger on the basis of the generated motion data and tactile data, and outputting the recognition result as recognition result information; and a wireless communication unit transmitting the recognition result information to a robot system.

13 Claims, 4 Drawing Sheets

THIMBLE-TYPE INTERMEDIATION DEVICE AND METHOD FOR RECOGNIZING FINGER GESTURE USING THE SAME

CROSS-REFERENCE TO RELATED APPLICATIONS

This application claims priority under 35 U.S.C. §119 to Korean Patent Application No. 10-2009-0126262, filed on Dec. 17, 2009, in the Korean Intellectual Property Office, the disclosure of which is incorporated herein by reference in its entirety.

TECHNICAL FIELD

The following disclosure relates to a thimble-type intermediation device, and in particular, to a thimble-type intermediation device which is worn on a finger to recognize a motion for controlling a robot or performing input/output control of an information device.

BACKGROUND

Research has been conducted on an interface technology in which an interaction is performed through a variety of input/output interfaces. In particular, research is being actively conducted on a human-robot interaction technology in which a human and a robot interact with each other through a variety of communication channels such as a camera, a microphone, a speaker, a plurality of sensors, and a driver.

Recently, a variety of researches to control a robot through an image recognition technology and a voice recognition technology are being conducted in the human-robot interaction technology. The image recognition technology refers to a technology for controlling a robot through a user's motion, in which the robot recognizes the user's motion using image information acquired from a camera mounted on the robot. The voice recognition technology refers to a technology for controlling a robot through a user's voice, in which the robot acquires voice information of the user through a voice processing device such as a microphone or speaker, and recognizes the user's voice using the acquired voice information.

However, there is a limitation in applying the image recognition technology or the voice recognition technology to an actual environment, because of an effect caused by lighting, shadow, noise or the like. To overcome such a limitation, a method has been proposed, in which a user's motion is collected through an intermediation interface and then analyzed to drive and control a robot.

As the digital convergence trend becomes common, much attention is being paid to a device provided with a motion sensor in a portable terminal or game machine technology, without using a key-input or console-input device. The device recognizes a user's gesture through the motion sensor, and utilizes a key or button as an auxiliary unit.

In such a device, however, the motion sensor requires a large motion of a user, in order to accurately sense the user's motion. Therefore, the user may feel inconvenience. Furthermore, the motion sensor has difficulties in accurately sensing a small motion. In some cases, the device may be separated from a user such that an expected accident may take place.

SUMMARY

In one general aspect, a thimble-type intermediation device includes: a motion sensing unit sensing a motion of a user's finger and generating the sensed result as motion data; a tactile sensing block sensing a tactile behavior of the user's finger and generating the sensed result as tactile data; a control unit recognizing the gesture and tactile behavior of the user's finger on the basis of the generated motion data and tactile data, and outputting the recognition result as recognition result information; and a wireless communication unit transmitting the recognition result information to a robot system.

In another general aspect, a thimble-type intermediation device includes a main device worn on a first finger of a user and an auxiliary device worn on a second finger of the user. The main device includes: a main motion sensing unit sensing a motion of the first finger of the user and generating main motion data; a main tactile sensing block sensing a tactile behavior of the first finger of the user and generating main tactile data; a main control unit combining the generated main motion data and main tactile data with auxiliary motion data and auxiliary tactile data, which are transmitted from the auxiliary device and correspond to the second finger of the user, and outputting the combined result as recognition result information; a wireless communication unit transmitting the recognition result information to a robot system. The auxiliary device includes: an auxiliary motion sensing unit sensing a motion of the second finger of the user and generating auxiliary motion data; an auxiliary tactile sensing block sensing a tactile behavior of the second finger of the user and generating auxiliary tactile data; an auxiliary control unit recognizing the gesture and tactile behavior of the second finger of the user on the basis of the generated auxiliary motion data and auxiliary tactile data, generating the recognition result as auxiliary recognition result information, and transmitting the generated auxiliary recognition result information to the main control unit.

In another general aspect, a method for recognizing a finger gesture for controlling a robot or performing input/output control of an information device includes: sensing a motion and tactile behavior of a first finger of a user, and generating the sensed results as main motion data and main tactile data; sensing a motion and tactile behavior of a second finger of the user, and generating the sensed results as auxiliary motion data and auxiliary tactile data; combining the main motion data and main tactile data with the auxiliary motion data and auxiliary tactile data, and outputting the combined result as recognition result information; and transmitting the recognition result information to a robot system.

Other features and aspects will be apparent from the following detailed description, the drawings, and the claims.

DETAILED DESCRIPTION OF EMBODIMENTS

Figure 1:
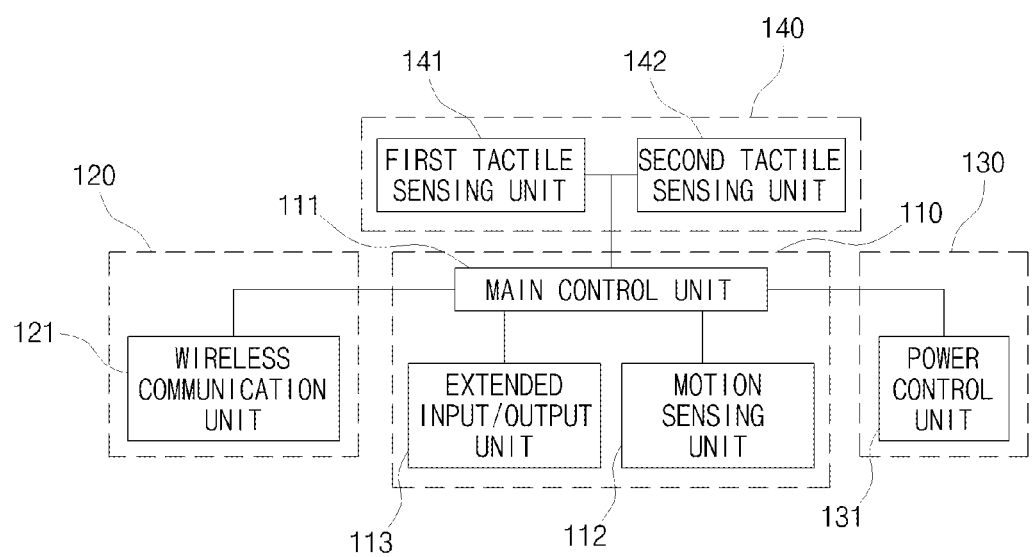
FIG. 1 is a block diagram of a thimble-type intermediation device according to an embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, embodiments of the present invention will be described with reference to the accompanying drawings.

FIG. 1 is a block diagram of a thimble-type intermediation device according to an embodiment of the present invention.

Referring to FIG. 1, the thimble-type intermediation device according to the embodiment of the present invention includes a main control block 110, a wireless communication block 120, a power control block 130, and a tactile sensing block 140.

The main control block 110 performs a recognition function by sensing a motion of a user's finger and processing motion data. The wireless communication block 120 transmits the recognition result information to a robot system or information device (not shown). The power control block 130 supplies and controls power. The tactile sensing block 140 senses a tactile behavior of the user's finger.

The respective blocks 110 to 140 included in the thimble-type intermediation device will be described in more detail as follows.

The main control block 110 includes a main control unit 111, a motion sensing unit 112, and an extended input/output unit 113. The motion sensing unit 112 senses a motion of a user's finger and generates motion data as the sensing data. The main control unit 111 receives the motion data from the motion sensing unit 112 and tactile data from the tactile sensing block 140, processes the received motion data and tactile data, and combines the processed data. Then, the main control unit 111 outputs the combined data as the recognition result information. The extended input/output unit 113 receives extended recognition result information from another thimble-type intermediation device which is additionally worn on another finger.

The wireless communication block 120 includes a wireless communication unit 121 transmitting and receiving data to and from a robot system or information device. In this embodiment of the present invention, the wireless communication unit 121 performs the data transmission and reception through the Bluetooth network. However, all types of wired and wireless communication networks may be used to perform the data transmission and reception.

The power control block 130 includes a power control unit 131 supplying power to the respective modules and controlling the power supply.

The tactile sensing block 140 is mounted at a position corresponding to a lower surface or side surface of a finger's end portion to determine whether it comes in contact with a ground or floor surface occurs or not. The tactile sensing block 140 includes a first tactile sensing unit 141 and a second tactile sensing unit 142. The first tactile sensing unit 141, which is mounted at a position corresponding to the lower surface of the finger's end portion, measures a force or pressure applied by the contact, and senses the measurement result as the contact state of the lower surface. The second tactile sensing unit 142, which is mounted at a position corresponding to the side surface of the finger's end portion, determines whether it comes in contact with another finger occurs or not, and senses the contact state of the side surface, such as a force or pressure applied by the contact.

In the embodiment of the present invention, the thimble-type intermediation device is worn on an index finger, and senses a tactile behavior of a lower surface of the index finger's end portion and a contact state between a thumb and a side surface of the index finger's end portion.

Figure 2:
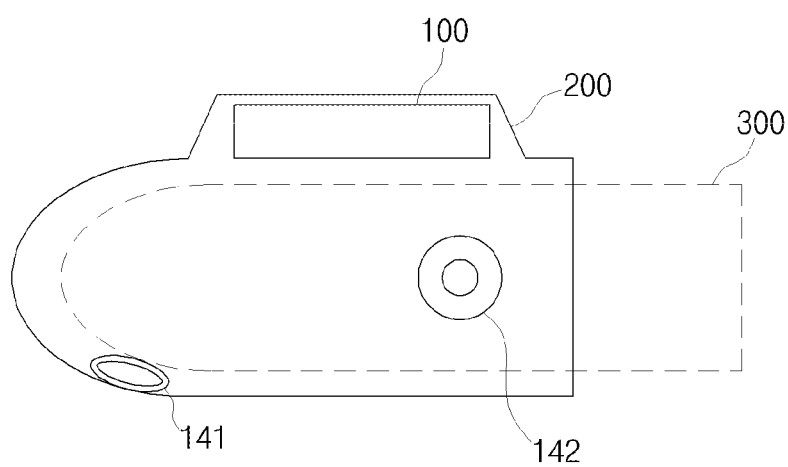
FIG. 2 is a diagram illustrating a schematic exterior structure of the thimble-type intermediation device illustrated in FIG. 1 and the arrangement structure of internal modules.

FIG. 2 is a diagram illustrating a schematic exterior structure of the thimble-type intermediation device illustrated in FIG. 1 and the arrangement structure of the internal modules. For convenience of description, FIG. 1 will be referred to together.

Referring to FIGS. 1 and 2, the thimble-type intermediation device includes a device controller 100 including the motion sensing unit 112, the wireless communication unit 121, and the power control unit 131, which are illustrated in FIG. 1 and process a motion of a user's finger 300, the first tactile sensing unit 141 determining whether a lower surface of the finger's end portion is contacted or not and sensing a force or pressure applied by the contact, the second tactile sensing unit 142 determining whether a side surface of the finger's end portion is contacted or not and sensing a force or pressure applied by the contact, and a body 200 including an internal housing formed of a flexible material (for example, soft plastic, silicon rubber, hard sponge or the like) for stably protecting the device controller 100.

Since the above-described components 100, 141, and 142 are built in the body 200, they are not seen from the outside of the thimble-type intermediation device.

Figure 3:
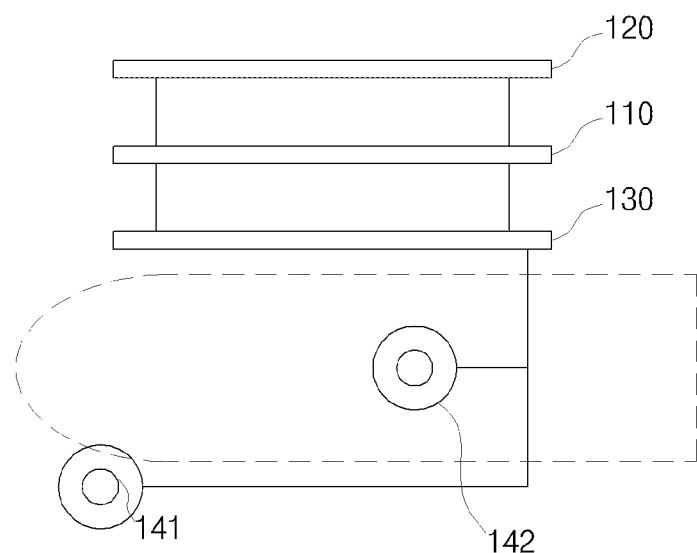
FIG. 3 is a diagram schematically illustrating the connection structure among the internal modules of the thimble-type intermediation device illustrated in FIG. 1.

FIG. 3 is a diagram schematically illustrating the connection structure among the internal modules of the thimble-type intermediation device illustrated in FIG. 1.

Referring to FIG. 3, the device controller 100 illustrated in FIG. 2 includes the main control block 110 sensing a motion of the user's finger, processing motion data, and outputting the processed result as recognition result information, the wireless communication block 120 transmitting the recognition result information to a robot system or information device, and the power control block 130 supplying and controlling power. The respective blocks 110 to 130 are electrically connected to one another, and the first and second tactile sensing units 141 and 142 are also connected to the device controller 100 so as to perform a power supply function and a data transmission and reception function. The device controller 100 may be implemented on a small Printed Circuit Board (PCB), or may be implemented on a flexible PCB (FPCB) so as to be disposed in a small area like a finger.

Figure 4:
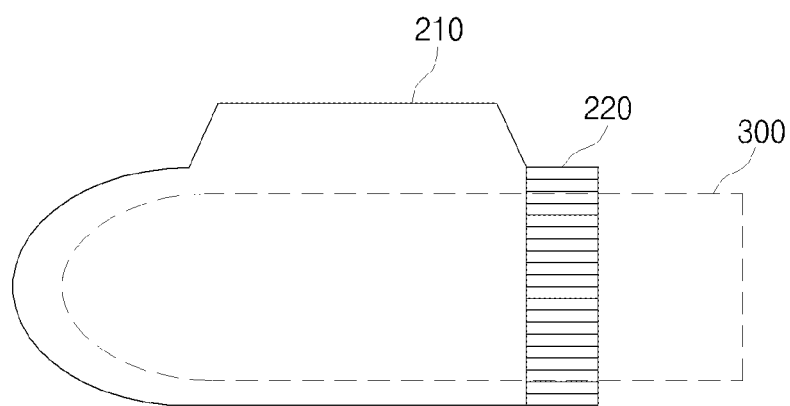
FIG. 4 is a diagram schematically illustrating the exterior of the thimble-type intermediation device illustrated in FIG. 1.

FIG. 4 is a diagram schematically illustrating the exterior of the thimble-type intermediation device illustrated in FIG. 1.

Referring to FIG. 4, the thimble-type intermediation device may include an exterior portion 210 which has such a finger shape as to be smoothly worn on the finger 300 and is formed of a flexible material (for example, rubber band or textile band) and a separation prevention portion 220 which is formed of an elastic material such as rubber to pressurize the circumference of the finger such that the thimble-type intermediation device is prevented from being separated from the finger.

Figure 5:
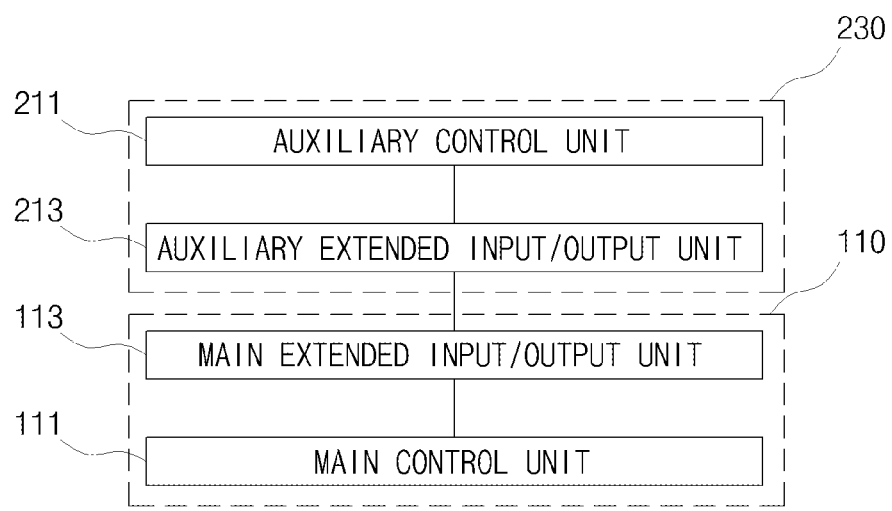
FIG. 5 is a block diagram illustrating the connection structure between two thimble-type intermediation devices which are worn on two fingers, respectively.

FIG. 5 is a block diagram illustrating the connection structure between two thimble-type intermediation devices which are worn on two fingers, respectively.

Referring to FIG. 5, the two thimble-type intermediation devices worn on two different fingers are connected to recognize gestures of the two fingers and an extended gesture from a contact state between the two fingers. That is, a main control block 110 of one thimble-type intermediation device worn on one finger is connected to an auxiliary control block 230 of the other thimble-type intermediation device worn on the other finger. The main control block 110 processes information based on the motion of the one finger, and the auxiliary control block 230 processes information based on the motion of the other finger.

The main control block 110 includes a main control unit 111 processing sensing data on the motion and contact state of the one finger and recognizing the processed sensing data, and an extended input/output unit 113 transmitting and receiving data to and from the auxiliary control block 230.

The auxiliary control block 230 includes an auxiliary control unit 211 processing sensing data on the motion and contact state of the other finger and recognizing the processed sensing data, and an auxiliary extended input/output unit 213 transmitting the processed sensing data recognized by the auxiliary control unit 211 to the main control block 110.

Meanwhile, when the thimble-type intermediation device is worn on only one finger, the extended input/output unit illustrated in FIGS. 1 and 5 does not perform the function and operation. Therefore, the design of the extended input/output unit may be excluded. When the thimble-type intermediation devices are worn on two fingers, that is, when a user performs a multi-motion input, the design of the extended input/output unit is required.

In the embodiment of the present invention, when a user uses a multi-motion input method, two devices worn on two fingers may be connected to each other through two kinds of connection methods. In the first method in two thimble-type intermediation devices use the same modules, one thimble-type intermediation device is set to a main control device, and the other thimble-type intermediation device is set to an auxiliary control device. In the connection structure between the two devices for transmitting and receiving data, the extended input/output units provided in the respective devices may be connected through a wire, or the wireless communication units provided in the respective devices may wirelessly transmit and receive data. In the second method, a device set to an auxiliary control device is implemented with only the main control block 110 illustrated in FIG. 1. At this time, in order to transmit sensed motion data to a main control device, an extended input/output unit included the auxiliary control device is connected to an extended input/output unit of the main control device through a wire.

Figure 6:
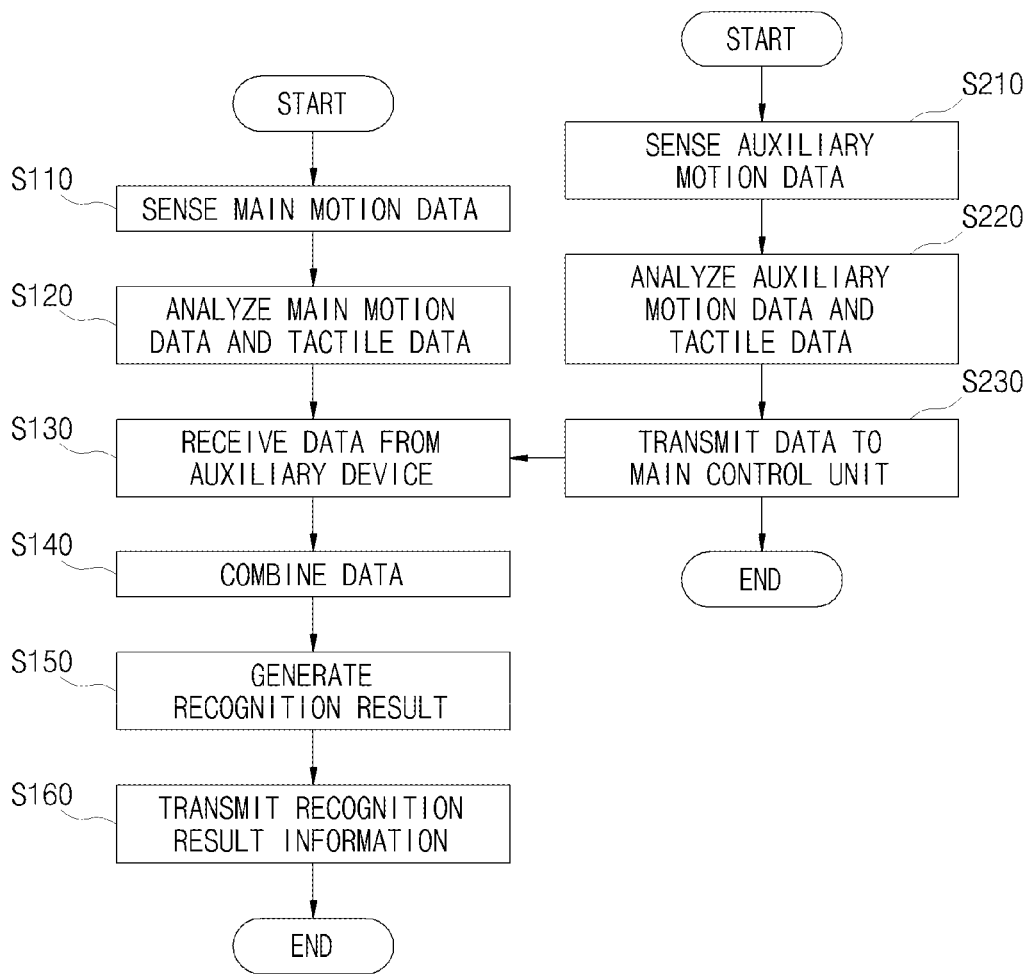
FIG. 6 is a flow chart explaining a method for controlling a robot system or information device using the thimble-type intermediation device illustrated in FIG. 1.

FIG. 6 is a flow chart explaining a method for controlling a robot system or information device using the thimble-type intermediation device illustrated in FIG. 1. For convenience of description, FIG. 1 will be referred to together.

Referring to FIGS. 1 and 6, a method for recognizing a finger gesture using a thimble-type intermediation device according to another embodiment of the present invention will be described as follows.

First, main motion data sensed by a motion sensing unit 112 included in a thimble-type intermediation device (hereinafter, referred to as a main device) worn on one finger is extracted in operation S110.

Then, a main control unit 111 analyzes the main motion data outputted from the motion sensing unit 112 and first and second tactile data sensed by first and second tactile sensing units 141 and 142 in operation S120.

Another thimble-type intermediation device (hereinafter, referred to as an auxiliary device) worn on another finger senses a motion of the finger in operation S210.

Then, an auxiliary motion sensing unit and an auxiliary tactile sensing unit, which are provided in the auxiliary device, acquire auxiliary motion data and auxiliary tactile data, and the acquired auxiliary motion data and auxiliary tactile data are analyzed in operation S220. The analysis result is transmitted to the main control unit of the main device in operation S230. Each of the main motion sensing unit and the auxiliary motion sensing unit for sensing the fingers' motion may be implemented as one of an acceleration sensor, a gyroscope sensor, and a geomagnetic sensor or a combination of at least two of them.

Each of the tactile sensing units provided in the main and auxiliary devices may be implemented as a tactile sensor such as a Force Sensing Resistor (FSR) capable of sensing the degree of tactile force or pressure or a tactile sensor which simply determines whether contact occurs or not.

When the main control unit 111 (refer to FIG. 3) of the main device receives data (motion data and tactile data) from the auxiliary control unit 211 (refer to FIG. 3) of the auxiliary device in operation S130, the motion data and tactile data sensed by the main device are combined with the motion data and tactile data sensed by the auxiliary device in operation S140. The combination operation of the data is performed by the main control unit 111 of the main device, and the main control unit outputs the combined data as the recognition result information in operation S150. The outputted recognition result information is transmitted to a robot system or information device in operation S160. The process is completed.

In the method for recognizing a finger gesture using the thimble-type intermediation device according to the embodiment of the present invention, a motion and tactile behavior of a finger of a user are sensed, and the sensed results are generated as main motion data and main tactile data, respectively. Furthermore, a motion and tactile behavior of another finger of the user are sensed, and the sensed results are generated as auxiliary motion data and auxiliary tactile data, respectively. Then, the main motion data and main tactile data are combined with the auxiliary motion data and auxiliary motion data, and the combined result is outputted as recognition result information. The recognition result information is transmitted to a robot system or information device including a computer through a wireless communication network, for example, the Bluetooth network.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A thimble-type intermediation device comprising:
a motion sensing unit configured to sense a motion of a user's finger and generate a result of the sensed motion as motion data;

a tactile sensing block configured to sense a tactile behavior of the user's finger including a force applied to the user's finger, and generate a result of the sensed tactile behavior as tactile data;
a control unit configured to recognize the motion and the tactile behavior of the user's finger on the basis of the motion data and the tactile data, and output a result of the recognition as recognition result information; and
a wireless communication unit configured to transmit the recognition result information to a robot system,
wherein the tactile sensing block senses a force applied to a lower surface and a side surface of an end portion of the user's finger.

2. The thimble-type intermediation device of claim 1, wherein the tactile sensing block comprises:
a first tactile sensing unit disposed at a position corresponding to the lower surface of the end portion of the user's finger, and configured to sense the force applied to the lower surface; and
a second tactile sensing unit disposed at a position corresponding to the side surface of the end portion of the user's finger, and configured to sense the force applied to the side surface.

3. The thimble-type intermediation device of claim 1, wherein the tactile sensing block comprises a Force Sensing Resistor (FSR) sensor.

4. The thimble-type intermediation device of claim 1, wherein the motion sensing unit comprises any one of an acceleration sensor, a gyroscope sensor, and a geomagnetic sensor or a combination of at least two of the sensors.

5. The thimble-type intermediation device of claim 1, further comprising a power control unit configured to supply power to the motion sensing unit, the tactile sensing block, the control unit, and the wireless communication unit, and control the power supply.

6. The thimble-type intermediation device of claim 1, wherein the wireless communication unit transmits the recognition result information to the robot system via a Bluetooth communication network.

7. A thimble-type intermediation device comprising:
a main device configured to be worn on a first finger of a user; and
an auxiliary device configured to be worn on a second finger of the user,
wherein the main device comprises:
a main motion sensing unit configured to sense a motion of the first finger of the user and generate main motion data;
a main tactile sensing block configured to sense a tactile behavior including a force applied to the first finger of the user, and generate main tactile data;
a main control unit configured to combine the main motion data and the main tactile data with auxiliary motion data and auxiliary tactile data, which are transmitted from the auxiliary device and are associated with the second finger of the user, and output a result of the combination as recognition result information; and
a wireless communication unit configured to transmit the recognition result information to a robot system,
wherein the auxiliary device comprises:
an auxiliary motion sensing unit configured to sense a motion of the second finger of the user and generate auxiliary motion data;
an auxiliary tactile sensing block configured to sense a tactile behavior including a force applied to the second finger of the user, and generate auxiliary tactile data; and
an auxiliary control unit configured to recognize the motion and the tactile behavior of the second finger of the user on the basis of the auxiliary motion data and the auxiliary tactile data, generate a result of the recognition as auxiliary recognition result information, and transmit the auxiliary recognition result information to the main control unit, and
wherein the main tactile sensing block comprises:
a first main tactile sensing unit disposed at a position corresponding to a lower surface of an end portion of the first finger of the user, and configured to sense a force applied to the lower surface of the end portion of the first finger of the user; and
a second main tactile sensing unit disposed at a position corresponding to a side surface of the end portion of the first finger of the user, and configured to sense a force applied to the side surface of the end portion of the first finger of the user.

8. The thimble-type intermediation device of claim 7, wherein the auxiliary device further comprises an auxiliary extended input/output unit performing an interfacing function with the main device and transmitting the auxiliary recognition result information to the main control unit of the main device, and
the main device further comprises a main extended input/output unit performing an interfacing function with the auxiliary device, coupled to the auxiliary extended input/output unit through any one of a wired and a wireless communication network, and receiving the auxiliary recognition result information to transfer to the main control unit.

9. The thimble-type intermediation device of claim 7, wherein the auxiliary tactile sensing block comprises:
a first auxiliary tactile sensing unit disposed at a position corresponding to a lower surface of an end portion of the second finger of the user, and configured to sense a force applied to the lower surface of the end portion of the second finger of the user; and
a second auxiliary tactile sensing unit disposed at a position corresponding to a side surface of the end portion of the second finger of the user, and configured to sense a force applied to the side surface of the end portion of the second finger of the user.

10. A method for recognizing a user's finger gesture for controlling a robot system or performing input/output control of an information device, comprising:
sensing a motion of a first finger of a user and a tactile behavior including a force applied to the first finger of the user, and generating a result of the sensed motion and tactile behavior of the first finger as main motion data and main tactile data;
sensing a motion of a second finger of the user and a tactile behavior including a force applied to the second finger of the user, and generating a result of the sensed motion and tactile behavior of the second finger as auxiliary motion data and auxiliary tactile data;
combining the main motion data and main tactile data with the auxiliary motion data and auxiliary tactile data, and outputting the combined result as recognition result information; and
transmitting the recognition result information to the robot system or the information device,
wherein sensing the main tactile data further comprises sensing a force applied to a lower surface of an end portion of the first finger of the user, and sensing a force applied to a side surface of an end portion of the first finger of the user.

11. The method of claim 10, wherein the generating of the main tactile data further comprises:

after sensing the force applied to the lower surface of the end portion of the first finger of the user, generating a result of the sensed tactile behavior as first tactile data; and after sensing on the force applied to the side surface of the end portion of the first finger of the user, generating a result of the sensed tactile behavior as second tactile data.

12. The method of claim 11, wherein the generating of the auxiliary tactile data comprises:

after sensing a force applied to a lower surface of an end portion of the second finger of the user, generating the sensed result as third tactile data; and after sensing a force applied to a side surface of the end portion of the second finger of the user, generating the sensed result as fourth tactile data.

13. The method of claim 10 further comprising:

transmitting the recognition result information to the robot system or the information device via a Bluetooth network.

* * * * *